T. E. DALY.
CART.
APPLICATION FILED MAR. 27, 1908.
911,212.
Patented Feb. 2, 1909.
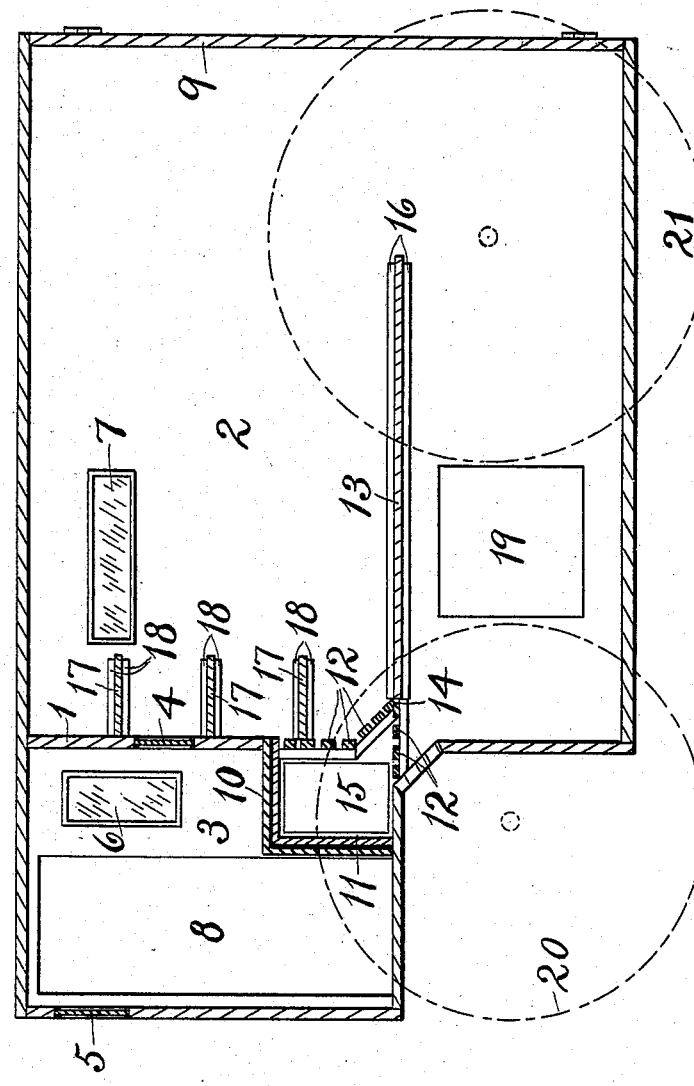
WITNESSES:
A. C. Fairbanks.
J. M. Sterne.
INVENTOR.
Thomas E. Daly,
BY
Webster & Co.,
ATTORNEYS.

UNITED STATES PATENT OFFICE.

THOMAS E. DALY, OF SPRINGFIELD, MASSACHUSETTS.

CART.

No. 911,212.  Specification of Letters Patent.  Patented Feb. 2, 1909.

Application filed March 27, 1908. Serial No. 423,702.

*To all whom it may concern:*

Be it known that I, THOMAS E. DALY, a citizen of the United States of America, residing at Springfield, in the county of Hampden and State of Massachusetts, have invented a new and useful Cart, of which the following is a specification.

My invention relates to improvements in carts or wagons which are intended more particularly for meat dealers who go from house to house, and consists essentially of a drop-bottom body vestibuled in front and equipped with certain shelves, doors and windows, and an ice-box which is located in the vestibule, forming the driver's seat, and opens into the main part of the body, all as hereinafter set forth.

The meat carts commonly used at the present time are much too small to carry such a supply of meat and other market commodities as the dealer would like to carry and often needs to carry, nor are such carts constructed to the best advantage for the purpose they are intended to serve, and the object of my invention is to produce a cart which overcomes these disadvantages. My cart is particularly well adapted to the requirements of the traveling dealer or butcher, not only by reason of its size, but also on account of the provision made therein for keeping certain parts of the cart cool, and owing to the arrangement of the shelves and of the doors and windows—all features of greater or less importance, individually, which combine in the achievement of the desired end.

I attain the object and secure the advantages of my invention by the means illustrated in the accompanying drawing, which is a longitudinal section through the body of a cart embodying said invention.

Referring to this view it will be observed that by a vertical partition 1 I divide my cart into a rear compartment 2 which has a low floor or drop bottom, and a front compartment or vestibule 3. There is a window 4 in the partition 1, also a window 5 in the front of the vestibule, and a window 6 in each side of said vestibule. Near the front in each side of the compartment 2 is a window 7. More or less windows may be provided as desired. A door-way 8 is cut in each side of the vestibule 3, which may be closed by means of a door or curtain, and at the back end of the compartment 2 is a door 9.

In the back part of the vestibule 3 built up from the floor or resting thereon is a seat 10 which is hollow to form an ice-box 11. The back side and a part of the floor of the ice-box 11 are perforated so that cold air from said box can enter the compartment 2. In this case the perforations in the back side and floor of the ice-box are provided by using slats 12 spaced apart for the back and the rear part of the floor, and in order to have the cold air enter the compartment 2 below as well as above a shelf 13 therein the ice-box is projected backward at the bottom into said compartment, as shown at 14. There is a door 15 in one end of the ice-box for the admission of the ice or the tank containing the same.

The shelf 13, which really constitutes a table of some considerable area, is so supported by cleats 16 on each side of the compartment 2 that its front edge abuts the apex 14 of the part of the ice-box 11 which is let into said compartment. This shelf is wide leaving behind it in the cart only room enough for the butcher to stand. Upon the shelf 13 is to be placed the meat and possibly some other supplies intended to be disposed of before the supplies which may be stored beneath said shelf are brought out. Above the shelf 13 are three, more or less, narrow shelves 17 supported by cleats 18 on the sides of the compartment 2. The front edge of the lowest shelf 17 abuts the perforated back of the ice-box 11, while corresponding edges of the other two shelves 17 abut the partition 1.

By the arrangement above described provision is made for keeping cool whatever may be placed on the lowest shelf 17, on the front part of the shelf 13, and in the front part of the space below said shelf 13, which is a valuable feature of my invention since it permits a large amount of supplies, meat especially, to be carried without danger of spoiling or deteriorating.

Access is had to the space below the shelf 13 from a door 19 in each side of the compartment 2, so located that it is clear of the wheels, which latter are indicated in the drawing by broken lines 20 and 21. Access to the aforesaid space is had also, of course, from below the rear edge of the shelf 13.

Much if not most of the supplies carried in this storage space will be introduced therein from the outside through the door 19, and will be removed at the rear on the inside of the cart to be placed on the shelf or shelves above.

The shelves are preferably supported in such a manner that they can be removed if desired, thus converting the cart into a van which is adapted to carry a large quantity of meat, groceries, etc., and rendering the cart useful when the stock of a store or market is to be replenished. The cleats 16 and 18 afford means of support of such a nature that the shelves can be readily drawn out of engagement therewith, the shelf 13 being removed necessarily through the rear door 9, and the other shelves usually being taken out through said door also.

As already intimated, the butcher stands in the compartment 2 back of the shelf 13 to handle and cut up his meat and to obtain his other supplies, instead of standing on the ground, which is obviously one of the advantages of the invention.

It is conceivable that numerous changes in matters of detail may be made in my invention without departing in any way from the nature thereof or going beyond the scope of my claims.

What I claim as my invention, and desire to secure by Letters Patent, is—

1. A drop-bottom cart body, a partition dividing said body into a vestibule and a supply compartment, a wide shelf or table on an approximate level with the floor of said vestibule and extending backward from the front end of said supply compartment toward the rear end thereof, and one or more narrow shelves independent of said table and adjacent to said partition.

2. A drop-bottom cart body, a partition dividing said body into a vestibule and a supply compartment, and a combined seat and ice-box in said vestibule in front of said partition, said ice-box opening behind into said supply compartment.

3. A drop-bottom cart body, a partition dividing said body into a vestibule and a supply compartment, an ice-box in said vestibule, said ice-box opening behind into said supply compartment, and a shelf or table in the supply compartment having one edge located adjacent to the open portion of the ice-box.

4. A drop-bottom cart body, a partition dividing said body into a vestibule and a supply compartment, a shelf or table in said supply compartment, and an ice-box in said vestibule, said ice-box opening at the rear into the supply compartment above and below the plane of said shelf.

5. A drop-bottom cart body, a partition dividing said body into a vestibule and a supply compartment, an ice-box in said vestibule, such ice-box being perforated at the back, a wide shelf or table in said supply compartment having its rear edge abutting the perforated back of said ice-box, and a narrow shelf above said wide shelf also having its rear edge abutting said perforated back.

6. A drop-bottom cart body, a partition dividing said body into a vestibule and a supply compartment, a wide shelf or table on an approximate level with the floor of said vestibule and extending backward from the front end of said supply compartment toward the rear end thereof and forming with the floor and front end of the compartment a storage space or chamber, and a door in one side of said compartment arranged to give access to said chamber.

THOMAS E. DALY.

Witnesses:
ALLEN WEBSTER,
F. A. CUTTER.